United States Patent [19]

Baillie

[11] 4,306,995

[45] Dec. 22, 1981

[54] METHOD FOR SEPARATION OF CONVERSION CATALYSTS FROM VAPOR-CATALYST MIXTURES

[75] Inventor: Lloyd A. Baillie, Homewood, Ill.

[73] Assignee: Atlantic Richfield Company, Philadelphia, Pa.

[21] Appl. No.: 144,492

[22] Filed: Apr. 28, 1980

Related U.S. Application Data

[62] Division of Ser. No. 962,453, Nov. 20, 1978, Pat. No. 4,229,194.

[51] Int. Cl.³ .................... B01J 29/38; B01J 8/26; B01D 45/12
[52] U.S. Cl. .................... 252/411 R; 55/1; 55/DIG. 14; 208/161; 422/147
[58] Field of Search .................... 208/167; 422/147; 55/397, 398, 435, 457, 459 R, 1, DIG. 14; 252/411 R

[56] References Cited

U.S. PATENT DOCUMENTS

| | | | |
|---|---|---|---|
| 1,055,792 | 3/1913 | Plock | 55/459 R |
| 2,655,464 | 10/1953 | Brown et al. | 208/161 X |
| 2,700,641 | 1/1955 | Rehbein | 208/161 X |

Primary Examiner—Michael S. Marcus
Attorney, Agent, or Firm—Stanley M. Welsh

[57] ABSTRACT

An improved apparatus for separating solid particles from vapor is disclosed which in one embodiment employs at least one zone defined by at least two generally vertical and at least two generally horizontal vanes and in another embodiment optionally employs at least one vane to inhibit turbulence in a lower portion of this apparatus to aid the settling of particles within a particle outlet means.

This apparatus is particularly suited to at least partially separating solid particles from a mixture of vapors and solid particles which arise either when restoring the catalytic activity of solid particles that had previously been used to promote a chemical conversion or when carrying out a chemical conversion, such as for example hydrocarbon cracking or reforming.

Improved methods employing such apparatus are also disclosed.

14 Claims, 8 Drawing Figures

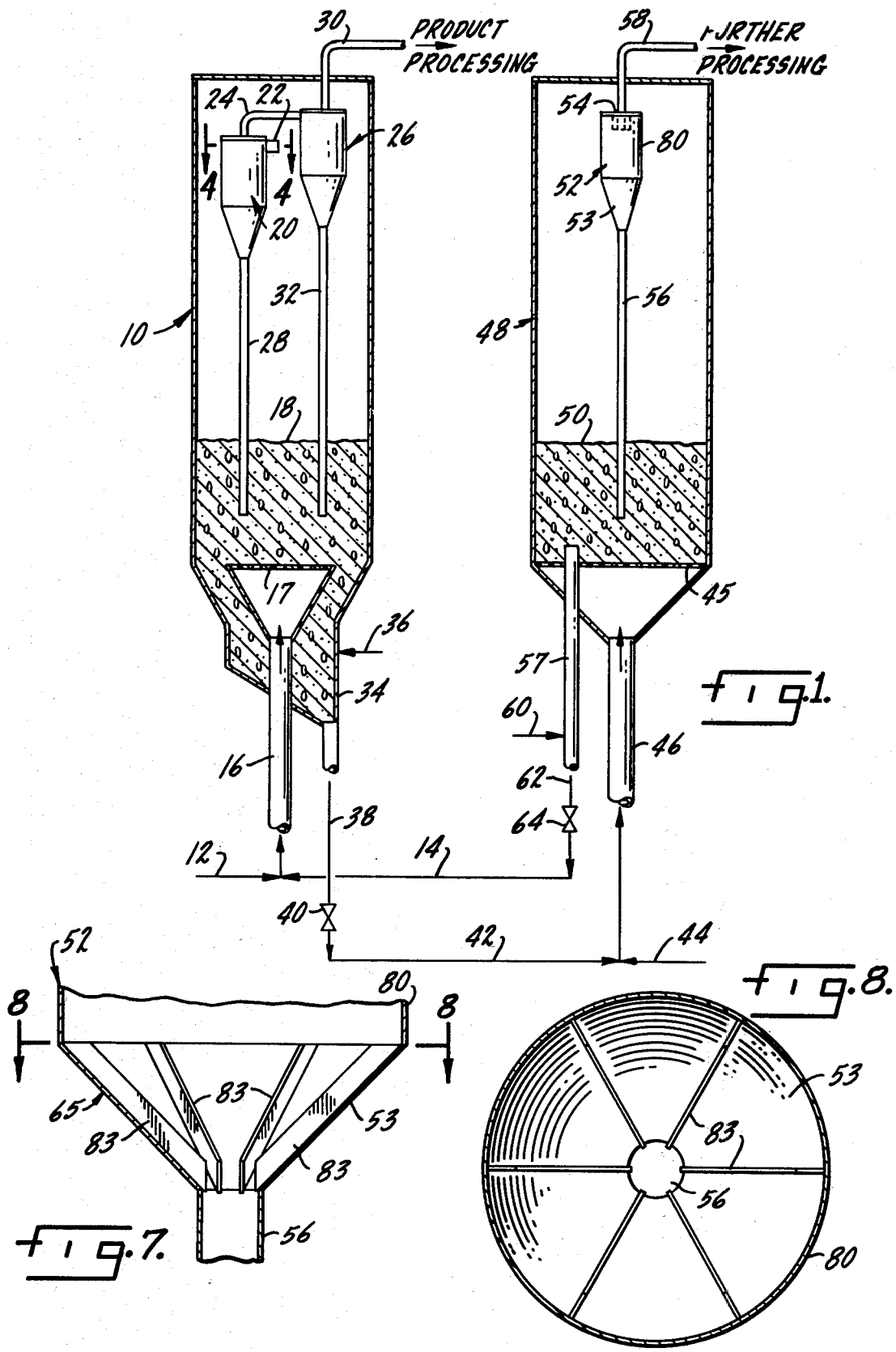

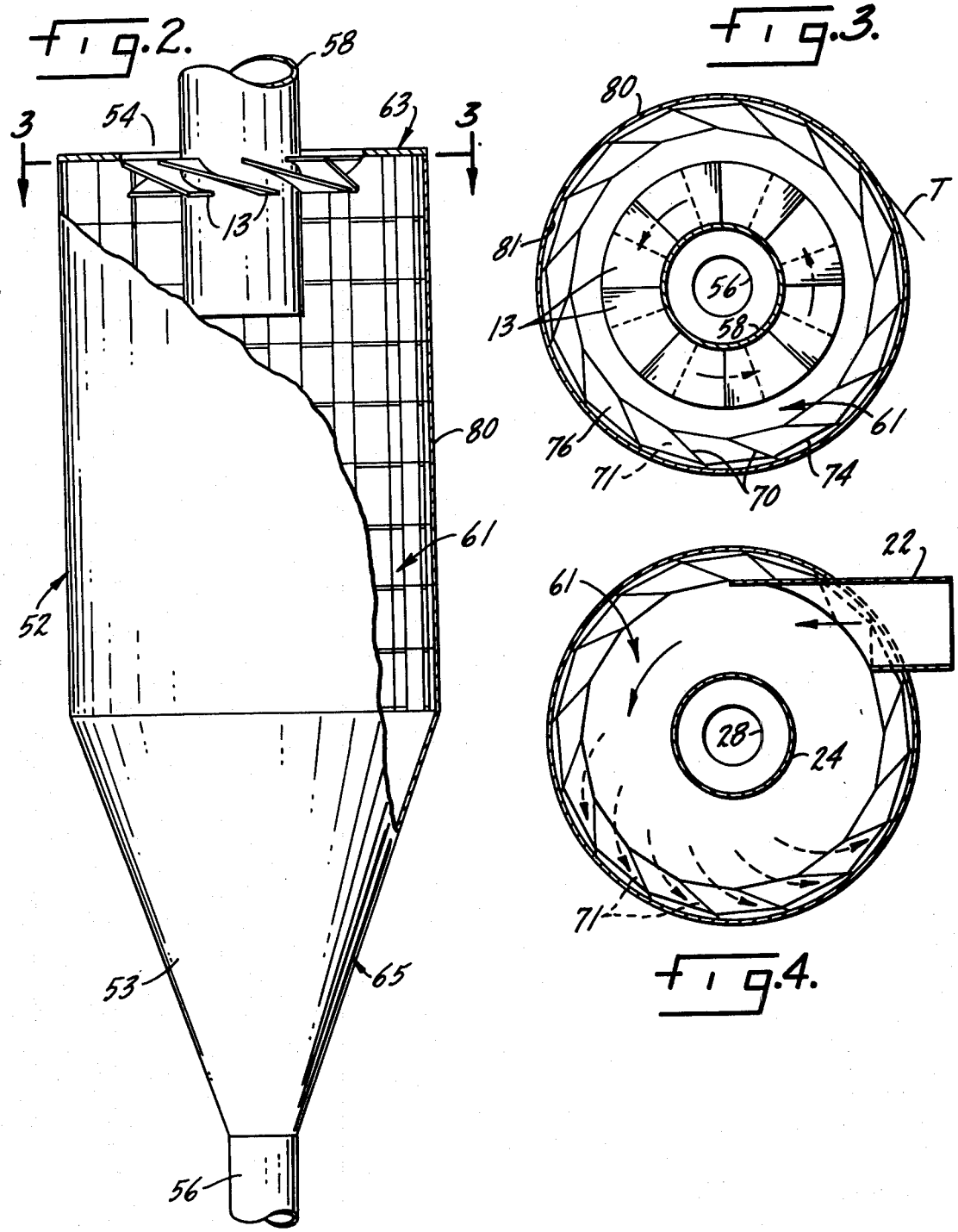

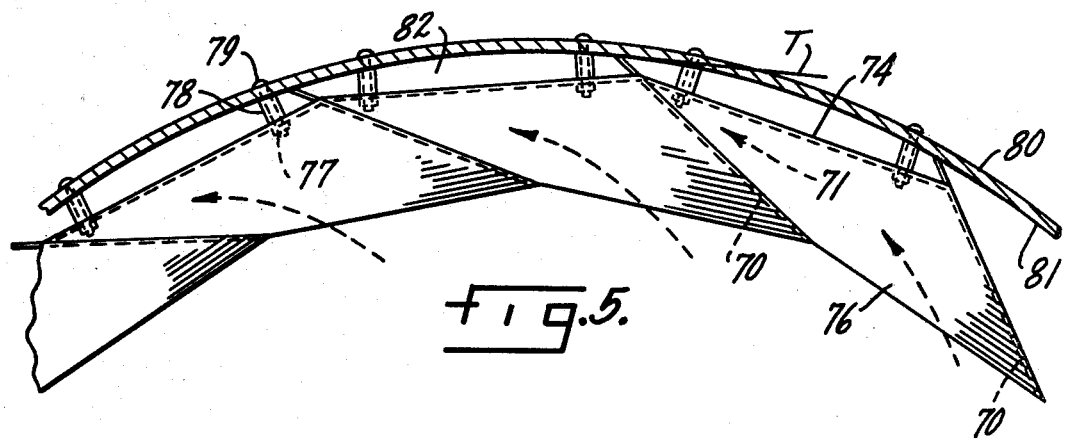
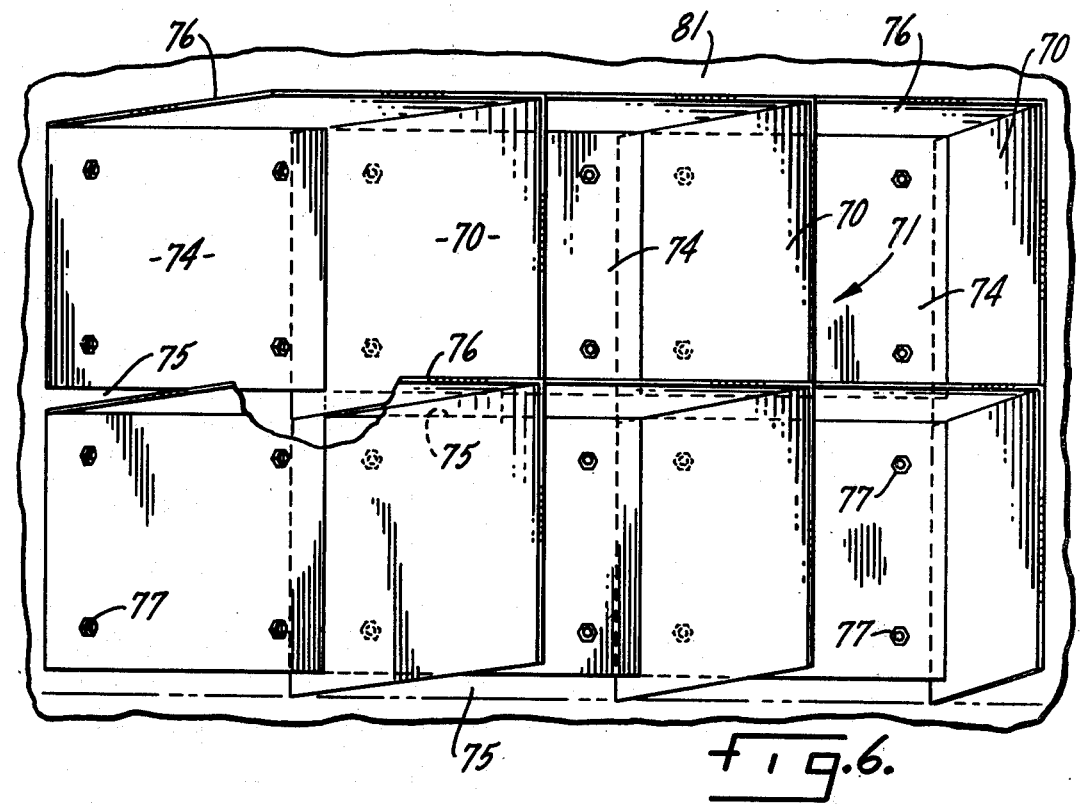

METHOD FOR SEPARATION OF CONVERSION CATALYSTS FROM VAPOR-CATALYST MIXTURES

This is a divisional of application Ser. No. 962,453, filed Nov. 20, 1978, now U.S. Pat. No. 4,229,194.

This invention relates to improved apparatus and methods such as are disclosed in U.S. Pat. No. 4,081,249 (1978) for carrying out chemical conversions and for restoring the catalytic activity of solid particles used to promote chemical conversions. More particularly, the invention relates to such improved apparatus and methods for carrying out chemical conversions and for restoring the catalytic activity of solid particles used to promote such conversions wherein mixtures of solid particles and vapor require separation.

In many instances throughout process industries, chemical reactions occur which are promoted by relatively small, e.g., diameters ranging from about 10 microns to about 500 microns, catalyst particles, for example, in fluidized bed reactors. One process involving such catalyst particles is the catalytic cracking of higher boiling hydrocarbons to gasoline and other lower boiling components. This process is used extensively in the petroleum industry. Often, apparatus used for carrying out chemical conversion, e.g., cracking of a feedstock, reforming, e.g., hydrocarbon gas oil, involves a reaction zone where the relatively small catalyst particles and feedstock are contacted with chemical conversion, e.g., hydrocarbon cracking or reforming etc., conditions to form at least one chemical conversion product, e.g., hydrocarbons having a lower boiling point than the hydrocarbon feedstock and/or a higher octane rating. Often, while promoting the desired chemical conversion, the catalyst particles have deposited thereon material, e.g., carbon, coke and the like, which acts to reduce the catalytic activity of these particles. Apparatus which are used to restore the catalytic activity of such particles often include a regeneration zone where the deposit-containing solid particles are contacted with oxygen-containing vapor at conditions to combust at least a portion of such deposited material.

Operation of each of the systems referred to above involves the formation of a mixture of solid particles and vapor followed at some point in time with a separation of at least a portion of said particles from said mixture. Therefore, both the apparatus for carrying out chemical conversion and the apparatus for restoring the catalytic activity of the solid catalyst particles include at least one separation zone wherein the mixture of solid particles and vapor formed in either a reaction or a regeneration zone, respectively, are at least partially separated. Such separation zones often involve conventional cyclone precipitators.

However, processing solid catalyst particles through such cyclone precipitators causes some particle attrition. That is, the solid catalyst particles have a tendency to fall apart and/or form fines while being processed through a separation system, e.g., cyclone precipitator. The resulting particle "fines" are often of such a size that they cannot be retained to promote chemical conversion. Accordingly, it is advantageous to provide for reduced attrition of solid catalyst particles.

Therefore, one object of the present invention is to provide apparatus and methods for carrying out chemical conversions, e.g., cracking or reforming, of a feedstock, e.g., hydrocarbon, using solid catalyst particles wherein attrition of the particles is reduced.

Another object of the present invention is to provide apparatus and methods for restoring the catalytic, e.g., hydrocarbon cracking or reforming, activity of solid catalyst particles wherein attrition of the particles is reduced.

Another object of the present invention is to provide apparatus and methods for separating solid particles from a mixture of solid particles and vapor wherein the attrition of separated solid particles is reduced.

Other objects and advantages of the present invention will become apparent hereinafter.

In one embodiment, the present invention involves an improved apparatus for carrying out a chemical conversion of a feedstock. This apparatus includes a chemical reaction zone wherein the feedstock, e.g., a substantially hydrocarbon material, is contacted with solid particles capable of promoting chemical conversion, e.g., hydrocarbon cracking, at chemical conversion conditions to form at least one chemical conversion product and a mixture of solid particles and vapor, the major portion, preferably at least about 90%, by weight of the solid particles having diameters in the range from about 10 microns to about 500 microns, preferably from about 20 microns to about 200 microns; and at least one separation means in fluid communication with the reaction zone, wherein the mixture of solid particles and vapor is at least partially separated. The separation means comprises a chamber defined by an interior surface, which can be of a variety of shapes, with cylindrical being preferred; an inlet means to the chamber in fluid communication with both the reaction zone and the chamber to allow entry of a mixture of solid particles and vapor into the chamber, the inlet means being situated so that movement of the mixture within the chamber causes solid particles to preferentially move toward the interior surface; a particle outlet means from the chamber to allow at least a portion of the solid particles of the mixture to exit the chamber; and a fluid outlet means from the chamber to allow at least a portion of the vapor component of the mixture to exit from the chamber. In one embodiment, the present improvement involves an arresting means located in spaced relation to, and preferably attached to, the interior surface to slow the velocity of at least a portion of the solid particles as the solid particles preferentially move toward the interior surface, thereby inhibiting the attrition of the solid particles.

An improved method of chemical conversion, e.g., hydrocarbon cracking or reforming, utilizing such improved apparatus has also been discovered.

In an additional embodiment, the present invention involves an apparatus for restoring the catalytic activity of solid particles which have previously been used to promote chemical conversions, e.g., hydrocarbon cracking, and have deactivating carbonaceous material deposited thereon, the major portion, preferably at least about 90%, by weight of the solid particles having diameters in the range from about 10 microns to about 500 microns, preferably from about 20 microns to about 200 microns. This apparatus includes a regeneration zone wherein solid particles having deactivating deposits thereon are contacted with oxygen-containing vapor under conditions to combust at least a portion of the deposits and form a mixture of solid particles and vapor; and in fluid communication with the regeneration zone at least one separation means wherein at least a portion of the solid particles are separated from the mixture. The separation means comprises a chamber defined by an interior surface; an inlet means to the chamber in fluid communication with both the regeneration zone and the chamber to allow entry of the mixture into the chamber, the inlet means being situated so that movement of the mixture within the chamber causes solid particles to preferentially move toward the interior surface; a particle outlet means from the chamber to allow at least a portion of the solid particles of the mixture to exit from the chamber; and a fluid outlet means from the chamber to allow at least a portion of the vapor of the mixture to exit from the chamber. The present improvement provides for arresting means located in spaced relation to, and preferably attached to, the interior surface to slow the velocity of at least a portion of the solid particles as the solid particles preferentially move toward the interior surface, thereby inhibiting the attrition of the solid particles.

An improved method for restoring the catalytic activity of solid particles utilizing this improved apparatus has also been found.

Each of the arresting means described above preferably involves a zone, which is located in spaced relationship to the interior surface and which comprises at least two generally vertical and at least two generally horizontal vanes which extend a distance, more preferably a substantially equal distance, toward the central axis of the chamber. Thus, in a more preferred embodiment, the end of each of the vertical vanes away from the interior cylindrical surface is at a substantially equal distance from the central axis of the chamber. Into these zones at least a portion of the solid particles from the mixture of such particles and vapor preferentially move. Further, the vertical vanes are preferably positioned so that each vane overlaps at least one adjacent vane when viewed from the central axis of the chamber.

The generally vertical vanes can be inclined at a predetermined, more preferably at a substantially uniform angle, e.g., in the range of about 0° to about 50° out of 360°, relative to a central axis of the chamber. These inclined vertical vanes act to urge solid particles in the proximity of the interior, e.g., cylindrical, surface of the chamber downward and thus, provide improved separation, and improved inhibition of solid particle attrition.

Each of the generally vertical vanes is at an angle chosen so that these vanes are generally parallel to the path of those solid particles induced to move toward the surface of the interior walls, thereby reducing as much as possible any attrition between such particles and such vanes. This angle, in the range of about 10° to about 75° out of 360°, is preferably uniform and is between each vertical vane and a plane tangent to the interior surface of the peripheral wall along a line of apparent intersection (defined hereinafter in the section entitled Detailed Description of The Invention). In other words, the generally vertical vanes are preferably inclined, as shown in FIGS. 4 and 5, against the general direction of spiralling flow of the mixture of vapors and solid particles at such angles to minimize both attrition to the particles and any resistance to the flow of the vapors.

The generally horizontal vanes extend a distance, more preferably a substantially equal distance, toward the central axis of the chamber. It is to be noted that in a preferred embodiment, the ends of both the vertical and horizontal vanes are at a substantially equal distance from the central axis of the chamber, but can be at different distances therefrom without departing from the scope or intent of this invention. Each horizontal vane forms an acute angle opened toward the central axis of the chamber between itself and the horizontal direction of the chamber in the range of between about 0° to about 50°, preferably between about 0° to about 30° and still more preferably between about 5° to 20° out of 360°.

The preferred vertical and horizontal vanes are planar, however, curved vanes for either can be used. In the case of curved vertical vanes, the surface of curvature is selected to minimize both flow resistance and attrition due to collision between the solid particles and such vanes. In the case of curved horizontal vanes, the surface of curvature is selected to encourage movement of deposited solid particles thereon to move toward the nearest portion of the interior wall.

The relative sizes of the components of the present apparatus may be varied depending on the particular application involved. For example, the reaction zone and regeneration zone can each have a volume ranging from about 10 cubic feet or less to about 100,000 cubic feet or more, preferably from about 100 cubic feet to about 50,000 cubic feet. The chamber of the present separation means typically can have an inside diameter when cylindrical ranging from about 0.1 foot to about 10 feet or more, preferably from about 1 foot to about 7 feet, and a length ranging from about 0.5 foot to about 50 feet or more, preferably from about 5 feet to about 35 feet.

The apparatus of the present invention include at least one separation means. However, often the apparatus involves a plurality, more preferably from about 3 to about 15, of such separation means in direct fluid communication with either the reaction zone or the regeneration zone. "In fluid communication" as used herein refers to communication wherein a mixture of solid particles and vapor can flow from the reaction zone or regeneration zone into the separation means. This is in contrast to the situation wherein staged separators, e.g., two or more separation means in series, are employed. The second and following separation means, if any, in a series are in fluid communication with the reaction zone or regeneration zone only indirectly. However, the present improved separation means can advantageously be used as either the first and/or succeeding separation means in such a series.

The inlet means of the present separation means can involve a conduit in fluid communications with both the reaction zone, or regeneration zone, and the chamber. Although the conduit may empty into the chamber from any convenient angle, preferably this conduit empties either substantially parallel to the central axis of the chamber, e.g., top inlet to a chamber situated so that its central axis is substantially vertical, or substantially tangential to the interior surface of the chamber.

When entry to the chamber from the conduit is substantially parallel to the central axis, the inlet means, for example, can further comprise flow directing means which direct the flow of a solid particles and vapor mixture in the chamber so that at least a portion of the solid particles preferentially move toward a peripheral wall. In a preferred embodiment, the flow directing means involve a plurality of baffles situated, e.g., at mutually inclined angles, so that as the mixture of solid particles and vapor from the conduit passes these baffles, the mixture is caused to flow in a generally spiralling path through the chamber. The angle of incline between the partial baffles helps determine the magnitude of the tangential velocity component, all other variables being equal. All other variables being equal, the greater the angle of incline between the partial baffles (in other words, the more horizontal the baffles in a vertical chamber), the greater the tangential velocity component.

Improved separation of solid particles and vapor is achieved generally at increased tangential velocities. However, such increased velocities tend to increase particle attrition. Therefore, the present apparatus can also involve at least one velocity altering means which preferably provides for separation of a portion, preferably a major portion, of the solid particles at relatively low tangential velocities, e.g., before the mixture of solid particles and vapor pass the velocity altering means. Increased tangential velocities allow improved separation of the particles from the remaining mixture. The velocity altering means is located between the inlet and the bottom of the chamber.

The present separation means can include flow redirecting or altering means, preferably a pair of partial baffles in spaced relation, preferably attached, to the interior surface at a distance along the interior or peripheral surface, e.g., below the inlet means, to redirect the flow of the mixture of solid particles and vapor in the chamber in a generally spiralling fashion through the remainder of the chamber. Such flow redirecting can be employed in the present separation means regardless of the angle at which the solid particles and vapor mixture enters the chamber from the inlet means, even when the conduit of the inlet means empties substantially tangentially to the interior cylindrical surface of the chamber.

Although the present invention is useful in many chemical conversions and catalyst regenerations, the apparatus and methods of this invention find particular applicability in systems for the catalytic cracking of hydrocarbons and the regeneration of catalysts so employed. Such catalytic hydrocarbon cracking often involves converting, i.e., cracking, heavier or higher boiling hydrocarbons to gasoline and other lower boiling components, such as hexane, hexene, pentane, pentene, butane, butylene, propane, propylene, ethane, ethylene, methane and mixtures thereof. Often, the substantially hydrocarbon feedstock comprises a gas oil fraction, e.g., derived from petroleum, shale oil, tar sand oil, coal and the like. Such feedstock may comprise a mixture of straight run, e.g., virgin gas oil. Such gas oil fractions often boil primarily in the range from about 400° F. to about 1000° F. Other substantially hydrocarbon feedstocks, e.g., other high boiling or heavy fractions of petroleum, shale oil, tar sand oil, coal and the like, can be cracked using the apparatus and method of the present invention. Such substantially hydrocarbon feedstock often contain minor amounts of contaminants, e.g., sulfur, nitrogen and the like.

Hydrocarbon cracking conditions are well known and often include temperatures from about 850° F. to about 1100° F., preferably from about 900° F. to about 1050° F. Other reaction conditions usually include pressures of up to about 100 psig.; catalyst to oil ratios of from about 5 to 1 to about 25 to 1; and weight hourly space velocities (weight of catalyst/weight of hydrocarbon feedstock/hour) of from about 3 to about 60. These hydrocarbon cracking conditions are not critical to the present invention and can be varied depending, for example, on the feedstock and catalyst being used and the product wanted. The hydrocarbon cracking reaction is generally conducted in the essential absence of added free molecular hydrogen.

In addition, the catalytic hydrocarbon cracking system includes an apparatus for restoring the catalytic activity of catalyst particles previously used to promote hydrocarbon cracking. This apparatus involves a catalyst regeneration zone into which at least a portion of the catalyst from the cracking reaction zone is withdrawn. Such catalyst is contacted with free oxygen-containing gas in the regeneration zone to restore or maintain the activity of the catalyst by removing, e.g., by combusting, carbonaceous material deposited on the catalyst particles. The combustion gas temperature in the regeneration zone is generally from about 900° F. to about 1500° F., preferably from about 900° F. to about 1400° F. and more preferably from about 1100° F. to about 1300° F. At least a portion of the regenerated catalyst is often returned to the hydrocarbon cracking reaction zone.

The catalyst particles useful in the catalytic hydrocarbon cracking embodiment of the present invention can be any conventional catalyst capable of promoting hydrocarbon cracking at the conditions present in the reaction zone, i.e., hydrocarbon cracking conditions. Similarly, the catalytic activity of such particles is restored at the conditions present in the regeneration zone. Typical among these conventional catalysts are those which comprise alumina, silica, silica-alumina, at least one crystalline alumino-silicate having pore diameters of from about 8 Å to about 15 Å and mixtures thereof. Because of the increased economic incentive for maintaining the particle size of a zeolite-containing catalyst, it is preferred that the catalyst particles comprise from about 1% to about 50%, more preferably from about 5% to about 25%, by weight of at least one crystalline alumino-silicate having a pore diameter of from about 8 Å to about 15 Å. At least a portion of the alumina, silica, silica-alumina and crystalline alumino-silicate may be replaced by clays which are conventionally used in hydrocarbon cracking catalyst compositions. Typical examples of these clays include halloysite or dehydrated halloysite (kaolinite), montmorillonite, bentonite and mixtures thereof. These catalyst compositions can also contain minor amounts of other inorganic oxides such as magnesia, zirconia, etc. The compositions can also include minor amounts of conventional combustion promoters such as the rare earth metals, in particular, cerium. Such catalyst compositions are commercially available in the form of relatively small particles, e.g., having diameters in the range from about 10 microns to about 500 microns, preferably from about 20 microns to about 200 microns.

In general, and except as otherwise provided for herein, the apparatus of the present invention can be fabricated from any suitable material or combination of materials of construction. The material or materials of construction used for each component of the present apparatus dependent upon the particular application involved. Of course, the apparatus should be made of materials which are substantially unaffected either physically or chemically, except for normal wear and tear, by the conditions at which the apparatus are normally operated. In general, such material or materials should have no substantial detrimental effect on the feedstock being chemically converted, the chemical conversion product or products or the catalyst being employed.

These and other aspects and advantages of the present invention are set forth in the following detailed description and claims, particularly when considered in conjunction with the accompanying drawings in which like parts bear like reference numerals.

DETAILED DESCRIPTION OF THE INVENTION

FIG. 1 is a simplified schematic view of a fluid bed catalytic hydrocarbon cracking reactor-regeneration system.

FIG. 2 is a partial side elevation view, with a portion of one peripheral wall cut away to disclose the interior.

FIG. 3 is an enlarged cross section view taken along line 3—3 of FIG. 2.

FIG. 4 is an enlarged cross sectional view taken along line 4—4 of FIG. 1.

FIG. 5 is an enlarged top view in cross section of a portion of the wall of FIG. 3.

FIG. 6 is an inside view of the portion of the wall shown in FIG. 5 but with left most vertical vane removed and portions of both a rear vane and horizontal vane removed.

FIG. 7 is an additional modification and alternate embodiment of a part of this invention disclosing a means for reducing turbulence in a dip leg or particle outlet means.

FIG. 8 is a cross-sectional view taken along line 8—8 of FIG. 7.

Referring now to the drawings, FIG. 1 shows a simplified schematic diagram of a catalytic hydrocarbon conversion reactor-regenerator system. Although the drawings and following description are directed particularly to catalytic hydrocarbon cracking, the present invention may be readily adapted to apparatus and methods for other chemical conversions and catalyst regenerations by those skilled in the art. In FIG. 1, reactor 10 provides the required space for catalytic hydrocarbon cracking to occur. Preheated hydrocarbon feedstock, e.g., petroleum derived gas oil, from line 12 is combined with catalyst particles, e.g., more than 90% by weight of such particles having diameters in the range from about 30 microns to about 100 microns, from line 14. The mixture of feedstock and catalyst flows through riser 16 (where a portion of the catalytic hydrocarbon cracking takes place) and through a diffuser means 17, e.g. a plate with holes, into reactor 10. The feedstock (and certain cracked products) form a "dense fluid bed" below level 18. The solid particles-vapor, e.g., cracked products and unreacted feedstock, mixture in reactor 10 above level 18 is in the form of a "lean fluid." This "lean fluid" enters first separator 20 tangentially through inlet 22. First separator 20 acts, as will be described in detail hereinafter, to separate a portion of the solid particles in the "lean fluid" from the remainder of the solid catalyst particles-vapor mixture, which is sent through line 24 to second separator 26. The separated solid particles from first separator 20 flow through first dip leg 28 to the "dense fluid bed" below level 18. The solid particles-vapor mixture in line 24 is conveyed to the top of second separator 26 which acts to further seperate solid particles from the vapor. Vapor from second separator 26 exits through line 30 and is sent to product processing, e.g., fractionation, other chemical reactions and the like, to produce a final saleable product. The vapor in line 30 may also require additional processing to remove any remaining solid particles, e.g., by conventional means well known in the art. The separated solid particles leave second separator 26 by second dip leg 32 which exits below level 18.

Solid particles are withdrawn from reactor 10 through stripper 34. Stripping gas, e.g., steam, from line 36 enters first stripper 34 and acts to strip hydrocarbon from the solid particles exiting reactor 10. The stripped solid catalyst particles from first stripper 34 flow through line 38, past valve 40, through line 42 and are combined with an oxygen-containing gas, e.g., air, from line 44. The mixture of solid catalyst particles, which have a carbonaceous deposit thereon that had formed in reactor 10, and oxygen-containing gas flow through pipe 46 through a diffusion means 45, e.g. a plate with holes, into regenerator 48 where at least a portion of the carbonaceous deposit on the solid catalyst particles is removed by combustion with the oxygen-containing gas. The "lean fluid" above the level 50 in regenerator 48 is a mixture of solid catalyst particles and vapor. This "lean fluid" enters separator 52 via top inlet 54, e.g. like that shown in FIG. 3. Separator 52 acts to separate solid catalyst particles, which exit separator 52 through third dip leg 56, from the vapor which exits separator 52 through outlet line 58. The vapor from line 58, which includes combustion flue gases, may be released to the atmosphere or further processed, for example, in an electrostatic precipitator, to remove any remaining solid particles.

Regenerated catalyst solid particles, i.e. catalyst particles which have had catalytic activity at least partially restored by removal of carbonaceous deposit, are removed from regenerator 48 through standpipe 57. As the solid catalyst particles flow through standpipe 57, fluidizing gas, e.g., steam, from line 60 enters standpipe 57, contacts the solid particles, thereby fluidizing the solid particles in standpipe 57 and acting to strip any remaining oxygen-containing gas from the solid particles. The thus fluidized and stripped solid catalyst particles flow from standpipe 57 through line 62, past valve 64 and into line 14. The solid catalyst particles from line 14 are combined with the hydrocarbon feedstock from line 12 and the cycle is repeated.

Separator 52 of FIG. 1 is shown in more detail in FIG. 2. Separator 52 comprises a top 63, a bottom 65 which, in this example, is in the form of a conical frustum 53, an inlet or top inlet means 54, an outlet means or a fluid outlet means 58, a plurality of zones 71, a hollow cylinder or a peripheral wall 80, and a particle outlet means which in FIGS. 1 and 2 is a dip leg 56. Chamber 61 of separator 52, is defined by a top 63, a bottom 65 and an interior surface 81 of peripheral wall 80. Inlet means 54 of FIG. 2 is axially oriented, but can be tangentially oriented as exemplified in FIG. 4 by tangential inlet 22. In FIG. 2, inlet means 54 comprises an opening between top 63 and outlet means 58. Surrounding and preferably attached to fluid outlet means 58 are baffles 13. Conical frustum 53 is one of many shapes that can be used for the bottom portion of cylindrical separator 52 as is well known in the art. Optionally, but preferably, one or more lower vanes 83 can be disposed within conical frustum 53 as shown in FIGS. 7 and 8. Spaced from the interior surface 81 of peripheral wall 80 is a plurality of zones 71 each of which zones 71 is defined by two generally vertical side vanes 70, a generally vertical rear vane 74, and two generally horizontal vanes 76.

Operation of separator 52 is as follows: a mixture of vapor and particles enters through inlet means 54 and is induced to flow in a downwardly directed counterclockwise spiral by interaction with baffles 13. This spiral induces solid particles contained within the mixture to preferentially move toward peripheral surface 81 and eventually to enter zones 71 spaced therefrom. Zones 71 are arresting means which reduce the degree of attrition that would otherwise occur during separation of some of the particles from the mixture. Dotted lines shown in FIGS. 4 and 5 indicate that the spiral flow causes a portion of the particles of the mixture to enter zones 71. The particles upon entering zones 71 gradually slow down as a result of the cushion of air contained within zones 71 and thereby slow down before contacting generally vertical vane 74. The particles upon loosing momentum fall generally downward under the influence of gravity and any current flows present onto top surfaces of generally horizontal vanes 76. Particles thus separated from the mixture of particles and vapor move or slide along the top surfaces of vanes 76 and through gap 75 into the space 82 defined by generally vertical vanes 70, 74 and the interior surface 81 of peripheral wall 80. Ultimately, these particles enter conical frustum 53 where lower vanes 83 (shown in FIGS. 7 and 8) are disposed therewithin. The presence of vane 83 tends to slow or diminish any turbulence that can be present within conical frustum 53 so as to lessen any attrition that might otherwise arise with respect to material within dip leg 56.

The solid particles in dip leg 56 provide a vapor seal so that the vortex of vapor in hollow cylinder 80 is forced through outlet line 58.

Of course, apparatus similar to separator 20 and/or separator 26 may be used in series with or as a replacement for separator 52 to separate the solid catalyst particles-vapor mixture from regenerator 48. Other combinations of apparatus similar to separators 20, 26 and 52 can also be used in either reactor 10 and regenerator 48. All such combinations are within the scope of this invention. In addition, separator 20 can include a top inlet (rather than the tangential inlet 22 shown) and also include at least one pair of partial baffles to cause the solid particles-vapor mixture to flow in a generally spiralling fashion generally downward through a portion of the space defined by hollow cylinder 80. Other modifications regarding position of various components of the present apparatus are also within the scope of the present invention.

Although FIG. 1 illustrates a single series of separators, i.e., separators 20 and 26 in series, and a single separator, i.e., separator 52, conventional reaction zones and regeneration zones often include a plurality of separators or series of separators. For example, reactor 10 and/or regenerator 48 can contain from about 2 to about 12 series of separators each in parallel with one another wherein there are, for example, from 1 to about 3 separators in each series. Each of the individual separators in each of these series can be constructed similarily to separators 20, 26 or 52. In any event, apparatus and methods involving such plurality of separators or series of separators are within the scope of the present invention.

FIGS. 5 and 6 provide enlarged views of zones 71. One means for locating zones 71 in spaced relation to peripheral surface 81 are bolts 79, spacers 78, and nuts 77. Bolt 79 is an example of a means for attaching rear vane 74 to peripheral surface 81. Spacers 78 provide a means for spacing rear vane 74 from peripheral wall 81. Rear vanes 74 also are spaced above the generally horizontal vane 76 so as to provide a gap or space 75 shown in FIG. 6. Gap 75 is a space between the top surface of vane 76 and the bottom edge of vane 74. Generally, each horizontal vane 76 forms an angle between itself and the horizontal direction of chamber 61 of about 15°. This angle is open toward the central axis of chamber 61.

Generally horizontal vanes 76 are preferably tilted so that particles deposited on the top surfaces of each of vanes 76 will have a tendency to slide toward peripheral wall 81. Vertical side vanes 70 preferably approach peripheral wall 81 closely, e.g., to distance of about 1/16 to ½ inch so as to provide a dead space 82 defined by interior peripheral surface 81 and generally vertical vanes 70 and 74.

The orientation of vane 70 with respect to interior peripheral surface 81 can be discussed in terms of an angle defined by a vane 70 and a tangent plane to interior surface 81 of peripheral wall 80 along a line of intersection (hereinafter and in the claims referred to as a "line of apparent intersection") between vane 70 itself or any co-planar extention of vane 70 necessary to intersect surface 81. A top view of such a tangent plane is shown in FIGS. 3 and 5 by lines "T." The angle with sides "T" and vane 70 can be in the range of about 10° to about 75° out of 360°. The preferred range of this angle depends upon the diameter of the spinning vapor within the cyclone, the mass of the particles within said spinning vapor, the gas velocity, the distance of surface 81 away from the center of the vortex of the spinning vapor, and the maximum distance vane 70 extends away from surface 81. The angle is chosen so as to minimize as much as possible attrition due to collisions between vertical vanes 70 and particles which are induced to move towards peripheral surface 81 or generally vertical rear vane 74. It is important to note that the vertex of the angle is defined along a line of apparent intersection and that this line itself can be inclined at some angle with respect to the vertical or central axis of the apparatus so as to permit a less impeded flow of spiralling downward material.

Vanes 70, 74 and 76 can be joined along fold lines when cut from a flat sheet or can be welded or bonded together along intersecting edges by means well known and understood by a person skilled in the sheet metal working art. The method of manufacture of vanes 70, 74 and 76 and their method of attachment to interior peripheral surfaces or walls is not deemed to be part of this invention.

The previous description of this invention with respect to specific embodiments disclosed in FIGS. 1-8 are intended to clarify the invention by way of examples. Variations of these examples based upon the teachings of this specification are readily apparent to one of skill in the art and are intended to be within the scope of this invention.

The embodiments of the invention, in which an exclusive property or privilege is claimed and defined, are as follows:

1. In a process for carrying out a chemical conversion of a feedstock which includes a chemical reaction zone wherein said feedstock is contacted with solid particles capable of promoting said chemical conversion at chemical conversion condition to form at least one chemical conversion product and a mixture of solid particles and vapor, the improvement comprising separating at least a portion of said solid particles from said mixture with at least one separation means which is in fluid communication with said reaction zone, wherein said at least one separation means is an apparatus for separating from a mixture of vapor and solid particles at least a portion of said particles therefrom comprising: a chamber defined by a top, a bottom and at least one peripheral wall, an inlet means for said mixture so situated so as to induce a flow of at least a portion of said particles preferentially toward said peripheral wall, a fluid outlet means, a particle outlet means and a means for reducing the attrition of said portion of said particles comprising a plurality of zones each of which is a partially enclosed space having an opening defined by at least two generally vertical vanes and two generally horizontal vanes acting in cooperation with at least a portion of said peripheral wall, wherein said horizontal vanes comprise a lower vane and an upper vane, wherein at least a substantial portion of the top and bottom edges defined by the surface of said vertical vanes overlap at least a portion of the surfaces defined by said horizontal vanes, and wherein there is a means for attaching at least one of said vertical and horizontal vanes to said peripheral wall, said opening being oriented with respect to said peripheral wall so that as said portion of said particles move toward said peripheral wall said particles enter at least a portion of said zones.

2. The process of claim 1 wherein an angle between one of said vertical side vanes and a plane tangent to said peripheral wall along a line of apparent intersection between said one of said vertical side vanes and said peripheral wall is in the range of about 10° to about 75°.

3. The process of claim 1 wherein said means for attaching is a generally vertical rear vane, wherein said vertical rear vane is at least in part spaced above said lower vane to provide a space therebetween and is attached to said peripheral wall, and wherein a plane defined by said vertical rear vane intersects along its vertical edges at least two generally vertical vanes.

4. The process of claim 1 wherein said bottom is in the shape of a conical frustum having disposed therein at least one vane, and further having said particle outlet means passing therethrough.

5. The process of claim 1 wherein each of said vertical vanes overlaps at least one adjacent vane of said vertical vanes when viewed from the central axis of said chamber.

6. The process of claim 1 wherein the inner ends of both the vertical and horizontal vanes are at substantially equal distances from the central axis of said chamber.

7. The process of claim 1 wherein each horizontal vane forms an acute angle opened toward the central axis of said chamber between itself and the horizontal direction of said chamber in the range of between about 0° to about 50°.

8. In a process for carrying out a regeneration of a catalyst previously used in a chemical conversion wherein deactivating deposits which had formed on the catalyst are removed in a regeneration zone and a mixture of regenerated particles and vapor is formed, the improvement comprising separating at least a portion of said regenerated particles from said mixture with at least one separation means being in fluid communication with said regeneration zone, wherein said at least one separation means is an apparatus for separating from a mixture of vapor and solid particles at least a portion of said particles therefrom, said apparatus comprising: a chamber defined by a top, a bottom and at least one peripheral wall, an inlet means for said mixture so situated so as to induce a flow of at least a portion of said particles preferentially toward said peripheral wall, a fluid outlet means, a particle outlet means and a means for reducing the attrition of said portion of said particles comprising a plurality of zones each of which is a partially enclosed space having an opening defined by at least two generally vertical vanes and two generally horizontal vanes acting in cooperation with at least a portion of said peripheral wall, wherein said horizontal vanes comprise a lower vane and an upper vane, wherein at least a substantial portion of the top and bottom edges defined by the surface of said vertical vanes overlap at least a portion of the surfaces defined by said horizontal vanes, and wherein there is a means for attaching at least one of said vertical and horizontal vanes to said peripheral wall, said opening being oriented with respect to said peripheral wall so that as said portion of said particles move toward said peripheral wall said particles enter at least a portion of said zones.

9. The process of claim 8 wherein an angle between one of said vertical side vanes and a plane tangent to said peripheral wall along a line of apparent intersection between said one of said vertical side vanes and said peripheral wall is in the range of about 10° to about 75°.

10. The process of claim 8 wherein said means for attaching is a generally vertical rear vane, wherein said vertical rear vane is at least in part spaced above said lower vane to provide a space therebetween and is attached to said peripheral wall, and wherein a plane defined by said vertical rear vane intersects along its vertical edges at least two generally vertical vanes.

11. The process of claim 8 wherein said bottom is in the shape of a conical frustum having disposed therein at least one vane, and further having said particle outlet means passing therethrough.

12. The process of claim 8 wherein each of said vertical vanes overlaps at least one adjacent vane of said vertical vanes when viewed from the central axis of said chamber.

13. The process of claim 8 wherein the inner ends of both the vertical and horizontal vanes are at substantially equal distances from the central axis of said chamber.

14. The process of claim 8 wherein each horizontal vane forms an acute angle opened toward the central axis of said chamber between itself and the horizontal direction of said chamber in the range of between about 0° to about 50°.

* * * * *